Sept. 24, 1929.  D. B. WHITEHILL  1,729,143
LUBRICATOR
Filed May 22, 1926

David B. Whitehill
INVENTOR

WITNESSES
BY
ATTORNEY

Patented Sept. 24, 1929

1,729,143

UNITED STATES PATENT OFFICE

DAVID BROWN WHITEHILL, OF CLARENDON, PENNSYLVANIA

LUBRICATOR

Application filed May 22, 1926. Serial No. 111,006.

This invention relates to a lubricator adapted to be used in connection with an oil cup for regulating feed therefrom to the working parts to be lubricated.

The invention has for its object to provide a lubricating device, which may be positively and automatically actuated to feed the oil from the oil cup, drop by drop, at such rate as to insure proper lubrication, and without unnecessary waste.

With this general object in view, the invention consists in certain details of construction and combinations of elements, the advantages of which will be more particularly explained in connection with the accompanying drawing, which illustrates the preferred form of the invention.

Figure 1:
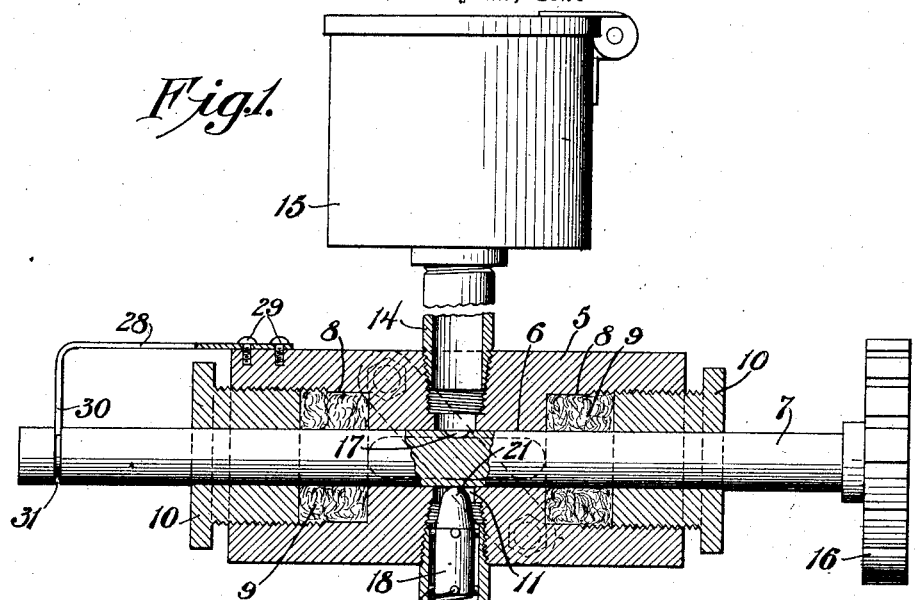
Figure 1 is a vertical longitudinal section through the invention.
Figure 2:
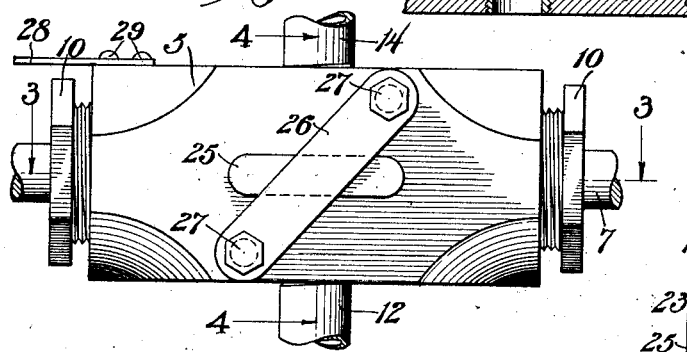
Figure 2 is a side elevation thereof.
Figure 3:
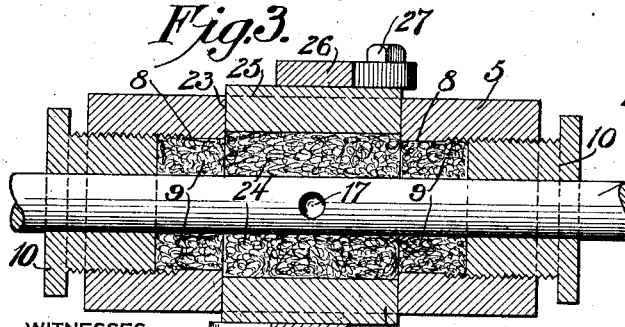
Figure 3 is a section taken on the line 3—3 of Figure 2.
Figure 4:
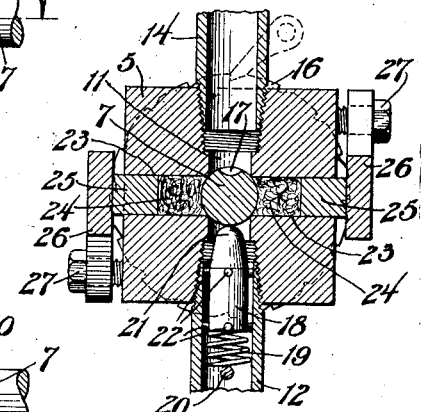
Figure 4 is a section taken on the line 4—4 of Figure 2.

The illustrated embodiment of the invention comprises a boxing 5, having a longitudinal bore 6 in which a shaft 7 is journaled. Each end of the boxing also has a counter bore 8 adapted to receive packing 9, and internally threaded to receive an adjustable packing gland 10.

The boxing 5 is also formed with a vertical bore 11, intersecting the bore 6 midway of its ends, and threaded at its lower end to receive a nipple 12, which connects it to a housing 13 of the part to be lubricated. The upper end of the bore 11 is also threaded to receive a nipple 14, which leads from an oil cup 15.

The shaft 7 may be provided with any suitable means for slowly rotating the same, as, for instance, a ratchet wheel 16 secured to one end thereof.

The shaft 7 is also formed with a recess 17 in the plane of the vertical bore 11, so that as the shaft rotates the recess 17 will receive a drop of oil from the upper part of the vertical bore, and discharge it through the lower part thereof into the nipple 12. In order to make this discharge more certain, a wiper 18 is mounted within the nipple 12, and is yieldably held in contact with the shaft 7 by a spring 19, seated against a pin 20 set in the walls of the nipple. The upper end of the wiper 18 is formed with a rounded nose 21, adapted to enter the recess 17 and expel therefrom the oil which might otherwise adhere to the wall of the recess and fail to drop. The wiper 18 is somewhat less in diameter than the nipple, and is guided therein by pins 22 which project laterally from the wiper.

The boxing 5 is also formed with a transverse channel 23 disposed diametrically thereof, so as to intersect the bore 6. This channel is adapted to receive packing 24 at each side of the shaft 7, and a packing gland 25 is pressed into contact with the packing by a pressure bar 26. This pressure bar is secured to the boxing by screws 27, which may be adjusted to impart the required amount of pressure to the packing 24. It will also be noted that the pressure bars 26 are arranged diagonally, so that the screws 27 are located where the holes for receiving the same will not interfere with the proper function of the boxing and packing.

The shaft 7 may be held against longitudinal movement by any suitable means, that shown consisting of a strap 28, secured at 29 to the boxing 5, and having an inturned end 30 engaging a circumferential groove 31 formed in the sahft.

The packing 9, together with the packing 24, effectually prevents the oil from leaking, and does not interfere materially with the transference of the oil, drop by drop, to the parts to be lubricated. While I have shown and described specifically the preferred form of the invention, it is apparent that various details thereof may be considerably modified without any material departure from the salient features of the invention as claimed.

What is claimed is:

1. A lubricating device comprising a shaft, a boxing formed with a longitudinal bore in which the shaft is journaled, a counter bore at each end of the boxing, a packing gland cooperating with each counter bore, a vertical bore through the boxing intersecting the longitudinal bore, means for supplying oil to the upper end of said vertical bore, means for rotating the shaft, said shaft having a recess in the plane of the vertical bore to receive a drop of oil from the upper part of said vertical bore and discharge it into the lower part thereof, said boxing having a transverse horizontal channel therethrough in the plane of the shaft, and a packing gland cooperating with each end of said channel.

2. A lubricating device comprising a shaft, a boxing formed with a longitudinal bore in which the shaft is journaled, a vertical bore through the boxing intersecting the longitudinal bore, means for supplying oil to the upper end of said vertical bore, means for rotating the shaft, said shaft having a recess in the plane of the vertical bore to receive a drop of oil from the upper part of said vertical bore and discharge it into the lower part thereof, said boxing having a transverse horizontal channel therethrough intersecting the two bores where they intersect each other, packing glands cooperating with the ends of the channel, pressure members extending diagonally across the outer ends of said packing glands, means for securing said pressure members to the outside of the box and adjusting their pressure against the packing glands, and packing surrounding the shaft at each end of the longitudinal bore.

3. A lubricator comprising, in combination, a box, a shaft having an oil-receiving depression mounted in the box, said box having a recess communicating at one side with a source of lubricant supply and at the other side with a part to be lubricated, said depression in the shaft adapted to transfer the lubricant, stuffing boxes around the shaft on opposite sides of the depression, and adjustable packing glands on opposite sides of the shaft to prevent leakage around the shaft.

4. A lubricator comprising, in combination, a box; a rotatable shaft mounted in the box; a packing gland at each end of the box around the shaft; said box having a lubricant receiving and a lubricant discharge opening therethrough transversely of the shaft; said shaft having an oil receiving depression adapted to align with said openings, when the shaft is rotated; a spring pressed plunger mounted in the discharge opening adapted to be forced into the depression to expel the lubricant therefrom and adjustable packing glands on opposite sides of the shaft to prevent leakage around the shaft.

In testimony, that I claim the foregoing as my own, I have hereto affixed my signature.

DAVID BROWN WHITEHILL.